(12) United States Patent
Beeken et al.

(10) Patent No.: US 10,209,910 B2
(45) Date of Patent: Feb. 19, 2019

(54) COPY-REDIRECT ON WRITE

(71) Applicant: International Business Machines Corporation, Armonk, NY (US)

(72) Inventors: Christopher B. E. Beeken, Eastleigh (GB); Joanna K. Brown, Winchester (GB); Carlos F. Fuente, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/882,107

(22) Filed: Jan. 29, 2018

(65) Prior Publication Data

US 2018/0165027 A1    Jun. 14, 2018

Related U.S. Application Data

(63) Continuation of application No. 14/859,385, filed on Sep. 21, 2015, now Pat. No. 9,940,041.

(51) Int. Cl.
G06F 3/06 (2006.01)

(52) U.S. Cl.
CPC ............ G06F 3/0619 (2013.01); G06F 3/065 (2013.01); G06F 3/0689 (2013.01)

(58) Field of Classification Search
CPC ....... G06F 3/0619; G06F 3/065; G06F 3/0689
See application file for complete search history.

(56) References Cited

U.S. PATENT DOCUMENTS 7,386,695 B2   6/2008   Fuente
7,930,498 B2   4/2011   Shitomi
8,533,411 B2   9/2013   Agombar et al.
8,549,242 B2   10/2013  Blea et al.
8,650,145 B2   2/2014   Navarro et al.
(Continued)

FOREIGN PATENT DOCUMENTS

WO    2011110542 A1    9/2011
WO    2017051270 A1    3/2017

OTHER PUBLICATIONS

Li et al., "iRow: An Efficient Live Snapshot System for Virtual Machine Disk", 2012 IEEE 18th International Conference on Parallel and Distributed Systems, © 2012, IEEE, Captured Mar. 25, 2015, pp. 376-383, DOI 10.1109/I 10.1109/I 10.1109/ICPADS.2012.59, <http://ieeexplore.ieee.org/stamp/stamp.jsp?tp=&arnumber=6413673>.

(Continued)

*Primary Examiner* — Reginald G Bragdon
*Assistant Examiner* — Mehdi Namazi
(74) *Attorney, Agent, or Firm* — Isaac J. Gooshaw

(57) ABSTRACT

A system, method, and computer program product for managing storage volumes in a point-in-time copy cascade. A processor swaps a host portion of a source volume with a host portion of a snapshot point-in-time copy volume. Responsive to an I/O request to overwrite a first data value in a grain of the source volume with a second data value, a processor writes the second data value in a corresponding grain of the snapshot point-in-time copy volume. Responsive to a corresponding grain of a clone point-in-time copy volume not comprising the first data value, a processor copies the first data value to the corresponding grain of the clone point-in-time copy volume.

6 Claims, 17 Drawing Sheets

(56) References Cited

U.S. PATENT DOCUMENTS

| | | |
|---|---|---|
| 8,719,523 B2 | 5/2014 | Beeken et al. |
| 8,868,869 B2 | 10/2014 | Jones et al. |
| 2011/0296127 A1* | 12/2011 | Agombar ............ G06F 11/1448 711/162 |
| 2013/0346714 A1 | 12/2013 | Solihin |
| 2017/0083250 A1 | 3/2017 | Beeken et al. |

OTHER PUBLICATIONS

Navarro et al., "FuSnap: Fuzzy Control of Logical Volume Snapshot Replication for Disk Arrays", IEEE Transactions on Industrial Electronics, vol. 58, No. 9, Sep. 2011, © 2011 IEEE, pp. 4436-4444, Digital Object Identifier 10.1109/TIE.2010.2103531.
International Search Report and Written Opinion, dated Dec. 14, 2016, PCT/IB2016/055040, International Filing Date Aug. 24, 2016, 9 pages.
IBM Appendix P., "List of IBM Patents or Patent Applications to be Treated as Related", Dated Jan. 29, 2018, 2 pages.

* cited by examiner

COPY-REDIRECT ON WRITE

BACKGROUND OF THE INVENTION

The present invention relates to the field of computer storage systems, and particularly to advanced function storage systems providing a point-in-time copy function.

In the field of computer storage systems, there is increasing demand for what have come to be described as "advanced functions". Such functions go beyond the simple Input/Output (I/O) functions of conventional storage controller systems. Advanced functions depend on the control of metadata used to retain state data about user data stored in the system. The manipulations available using advanced functions enable various actions to be applied quickly to virtual images of data, while leaving the user data available for use by user applications. One such advanced function is point-in-time copy.

Point-in-time copy is a feature supported on various storage devices that allows nearly instantaneous point-in-time copies of entire logical volumes or data sets to be made. The point-in-time function enables one to make full volume copies of data, with the copies immediately available for read or write access. The copy may be used with standard backup tools that are available in a computing environment to create backup copies on tape.

"Snapshot" provides the ability to record the state of a storage device at any given moment and preserve that snapshot as a guide for restoring the storage device in the event that it fails. A snapshot primarily creates a point-in-time copy of the data. Typically, a snapshot copy function is done instantly and made available for use by other applications such as data protection, data analysis and reporting, and data replication applications. The original copy of the data continues to be available to the applications without interruption, while the snapshot copy is used to perform other functions on the data. A snapshot is a point-in-time copy that is dependent on the primary disk. A snapshot may, for example, be accomplished using a copy-on-write procedure, in which currently existing data in a region on the primary disk is written to the backup disk when a write is being made to the region on the primary disk. Thus, the backup disk will contain data that has been overwritten on the primary disk, as opposed to a complete copy of the primary disk. This type of backup copy typically results in a thinly provisioned volume, which reduces storage. A series of snapshot copies may be cascaded together to represent the primary disk at various times. However, the snapshot copies typically remain dependent on the primary disk to reassemble a complete copy of the primary disk. Therefore, a snapshot is a point-in-time copy where the target only holds the changed data necessary to present the point-in-time copy of the source. Data is only copied to the target disk if it is changed on the source. The target disk is generally always dependent on some of the data on the source disk in order to present the point-in-time copy.

In contrast, a "clone" is a point-in-time copy that is independent of the primary disk. A clone may, for instance, be created by executing a background copy procedure in which a disk's regions are sequentially copied to the backup disk and executing a copy-on-write procedure to immediately copy any primary disk regions that are about to be overwritten due to a write and have not yet been processed by the background copy procedure. A clone is typically used when a copy is needed and input/output (I/O) to the copy must not impact I/O to the primary volume in any way. A clone may also be used when the copy is not to be affected by availability to the source. A clone may also be used in a cascade.

Therefore, a clone is a point-in-time copy where the target disk will hold a complete copy of the data that was on the source disk when the point-in-time copy was started. When the copying of the data from source to target completes, the target disk is independent of the source.

SUMMARY

Viewed from a first aspect, the present invention provides a method for managing storage volumes in a point-in-time copy cascade. A processor swaps a host portion of a source volume with a host portion of a snapshot point-in-time copy volume. Responsive to an I/O request to overwrite a first data value in a grain of the source volume with a second data value, a processor writes the second data value in a corresponding grain of the snapshot point-in-time copy volume. Responsive to a corresponding grain of a clone point-in-time copy volume not comprising the first data value, a processor copies the first data value to the corresponding grain of the clone point-in-time copy volume. Advantageously, this invention introduces a way of combining the redirect-on-write and copy-on-write algorithms into a new algorithm for use when creating snapshots. Embodiments of the present invention have the write I/O advantages of ROW when operating within one storage pool while using the COW algorithm that allows multiple storage tiers to be used when needed.

Viewed from a further aspect, the present invention provides a computer program product for managing storage volumes in a point-in-time copy cascade. A processor swaps a host portion of a source volume with a host portion of a snapshot point-in-time copy volume. Responsive to an I/O request to overwrite a first data value in a grain of the source volume with a second data value, a processor writes the second data value in a corresponding grain of the snapshot point-in-time copy volume. Responsive to a corresponding grain of a clone point-in-time copy volume not comprising the first data value, a processor copies the first data value to the corresponding grain of the clone point-in-time copy volume. Advantageously, this invention introduces a way of combining the redirect-on-write and copy-on-write algorithms into a new algorithm for use when creating snapshots. Embodiments of the present invention have the write I/O advantages of ROW when operating within one storage pool while using the COW algorithm that allows multiple storage tiers to be used when needed.

Viewed from a further aspect, the present invention provides a computer system for managing storage volumes in a point-in-time copy cascade. A processor swaps a host portion of a source volume with a host portion of a snapshot point-in-time copy volume. Responsive to an I/O request to overwrite a first data value in a grain of the source volume with a second data value, a processor writes the second data value in a corresponding grain of the snapshot point-in-time copy volume. Responsive to a corresponding grain of a clone point-in-time copy volume not comprising the first data value, a processor copies the first data value to the corresponding grain of the clone point-in-time copy volume. Advantageously, this invention introduces a way of combining the redirect-on-write and copy-on-write algorithms into a new algorithm for use when creating snapshots. Embodiments of the present invention have the write I/O advantages of ROW when operating within one storage pool while using the COW algorithm that allows multiple storage tiers to be used when needed.

DETAILED DESCRIPTION

Figure 1:
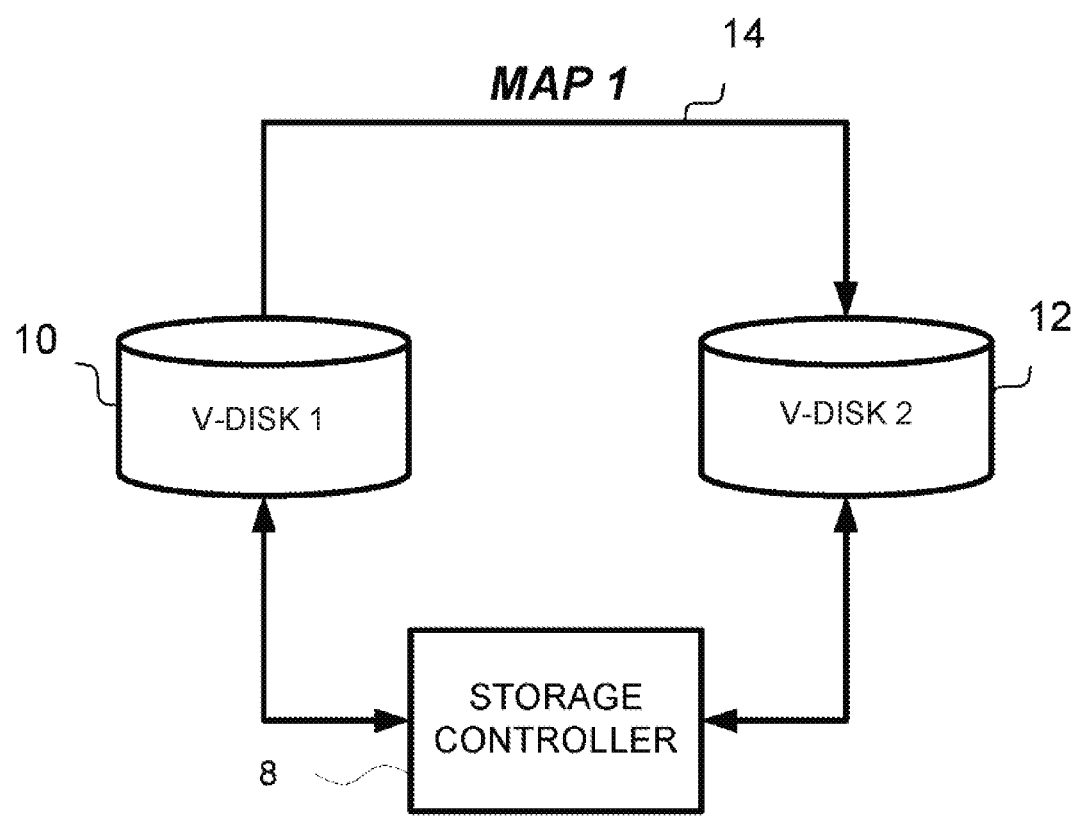
FIG. 1 depicts a backup process using a storage controller and two storage disks, in which an embodiment of the present invention may be implemented.

It is also possible to use point-in-time copy in cascaded implementations, in which a target disk later becomes the source disk for a further point-in-time copy or vice versa. A cascaded configuration of storage volumes is described in detail in U.S. Pat. No. 7,386,695 B2, incorporated herein by reference in its entirety, which describes an algorithm for implementing point-in-time copy functionality that provides improved source writes at the expense of target I/O. This has the advantage of allowing unlimited point-in-time copy images to be created from a single source while bounding the additional I/O required to maintain the point-in-time copies to an additional read and write.

U.S. Pat. No. 7,386,695 B2 (Fuente, Carlos F. "Storage System with Multiple Copy Targeting", Jun. 10, 2008), incorporated herein by reference in its entirety, discloses a storage controller, cooperable with host computer apparatus, and a plurality of controlled storage apparatus, comprising a host write component operable to write a data object to a source data image at one of the plurality of controlled storage apparatus; a first copy component responsive to a first metadata state and operable to control copying of the data object to a first target data image at one of the plurality of controlled storage apparatus; a second storage copy component responsive to a second metadata state and operable to perform one of: controlling copying of the data object to a second target data image at one of the plurality of controlled storage apparatus; and causing the first copy component to perform copying of the second target data image to the first target data image.

U.S. Pat. No. 8,688,937 B2 (Agombar, John P. et al "Method for Optimizing Cleaning of Maps in FlashCopy Cascades Containing Incremental Maps", Apr. 1, 2014), incorporated herein by reference in its entirety, discloses a method for optimizing cleaning of maps in point-in-time copy cascades including determining whether a target disk of a map contains data unavailable to a downstream disk from an upstream disk in a cascade and detects whether downstream disk has a copy of the data.

U.S. Pat. No. 8,793,453 B2 (Agombar, J. P. et al "Multiple Cascaded Backup Process", Jul. 29, 2014), incorporated herein by reference in its entirety, discloses handling a backup process. An instruction initiates a new backup from a source volume to a target volume using one a plurality of backup processes.

U.S. Pat. No. 8,868,860 B2 (Beeken, C. "Restore in Cascaded Copy Environment", Oct. 21 2014), incorporated herein by reference in its entirety, discloses handling of multiple backup processes comprising detecting that a defined storage volume is present in a first cascade of storage volumes; detecting that the defined storage volume is present in a second cascade of storage volumes; receiving a data write for a last storage volume in the first cascade of storage volume; and performing a cleaning data write on the defined storage volume in the second cascade of storage volumes, wherein the cleaning data write corresponds to the received data write.

When a point-in-time copy operation is initiated, a point-in-time relationship is created between the source volume and the target volume. Thus, a point-in-time relationship is a "mapping" of the point-in-time source volume and the point-in-time target volume. This mapping allows a point-in-time copy of that source volume to be copied to the associated target volume. The point-in-time relationship exists between this volume pair from the time that a point-in-time operation is initiated until the storage unit copies all data from the source volume to the target volume or until the point-in-time relationship is deleted. Moreover, a cascaded point-in-time configuration is one where the source disk of one map is the target disk of another map. For example, there may be one map defined with source disk A and target disk B, and another map defined with source disk B and target disk C. The cascade would include the three disks A, B and C and the two maps. Once the copies are made, the copies are immediately available for both read and write access.

When the data is physically copied, a background process copies tracks (or grains) from the source volume to the target volume. The amount of time that it takes to complete the background copy depends on, for example: the amount of data being copied; the number of background copy processes that are occurring and the other activities that are occurring on the storage system, amongst other factors.

When a point-in-time operation copies data from a source volume to a target volume, that source volume can be involved in more than one point-in-time relationship at the same time (known as a multiple relationship point-in-time).

That is, the multiple relationship point-in-time function allows a source volume to have multiple targets simultaneously. If a track on a volume is not a target track of an existing point-in-time relationship, it can become the target in a new point-in-time relationship.

Thus, for example, if multiple copies of the same data are required, this multiple relationship point-in-time function allows a single source volume to be copied multiple times to different target volumes as soon as a point-in-time volume is established. For example, suppose a point-in-time is used to copy volume A to volume B. As soon as that point-in-time relationship is established, volume A may be copied to volume C. Once that relationship is established, volume A may be copied to volume D, and so on. Additionally, multiple sessions within a single volume are possible.

A cascade may be used to implement multiple point-in-time copies of a single data source. For example, with a data source P and point-in-time copies of P taken at times t1, t2 and t3, then at time t1 there is taken a point-in-time copy using data target T1 resulting in a cascade: P to T1. Then at time t2 there is taken a second point-in-time copy using data target T2 and resulting in the cascade: P to T2 to T1. In effect, T1 is established as a copy of T2, which is, at this instant, identical with P, and T2 is a copy of P. A bitmap held by T2 that describes its differences from P also correctly describes its difference from T1. Updates to P only require a copy operation to copy from P to T2. Conversely, updates to T2 require two copy operations: from P to T2, and from T2 to T1. This is because updates to the middle of a chain force a copy to the relationships on either side. Adding a third backup T3 at t3 produces the cascade: P to T3 to T2 to T1.

This technique has many benefits. However, it also introduces dependencies between the data targets that may not exist in a traditional multiple target implementation. A side effect of this target dependency can be a requirement to "clean" a target when a point-in-time copy is stopped or completes. For example, if point-in-time copy P to T2 is stopped, any data on T2 that is required by T1 is typically copied from T2 to T1 before the target T2 can be removed from the cascade. In many situations this is not a problem, because the user may wish T1 to hold a complete copy of P at time t1, meaning that the backup process P to T1 is a clone. However, if the intention of P to T1 is just to produce a snapshot of P at time t1, this extra copying from T2 to T1 may cause the user problems. Further, if the data target T1 was thinly provisioned (also known as space efficient), the problems caused by the above behavior may cause the unnecessary allocation of storage to T1. In some applications this may reduce the user's ability to maintain snapshots and clones and to manage their backups.

There are a number of existing techniques that attempt to reduce the amount of data that is copied in a cleaning from one volume to another, such as from T2 to T1, with varying degrees of success. However, many such solutions can dramatically increase the amount of metadata used to track the contents of the various data targets.

Multiple target point-in-time copying, when implemented using a cascade methodology, offers great scalability in terms of number of copies whilst also giving the user the ability to make copies of copies. However, multiple target point-in-time when implemented using a cascade methodology also introduces the undesirable concept of having to "clean" a point-in-time map before it can be removed from a cascade. The cleaning process ensures that no disk in the cascade is dependent on the target disk of the map being removed. The cleaning process can take a considerable amount of time to complete.

Additionally, point-in-time may utilize space-efficient volumes. The point-in-time space-efficient (SE) feature allocates storage space on an "as-needed" basis by using space on a target volume only when it actually copies tracks (or grains) from the source volume to the target volume. Without space-efficient volumes, the point-in-time function requires that all the space on a target volume be allocated and available even if no data is copied there. However, with space-efficient volumes, point-in-time uses only the number of tracks (or grains) that are required to write the data that is changed during the lifetime of the point-in-time relationship, so the allocation of space is on an "as-needed" basis. Because space-efficient point-in-time volumes do not require a target volume that is the exact size of the source volume, the point-in-time SE feature increases the potential for a more effective use of system storage.

The space-efficiency attribute may be defined for the target volumes during the volume creation process. A space-efficient volume can be created from any extent pool that has already-created space-efficient storage. As long as the space-efficient source and target volumes have been created and are available, they can be selected when the point-in-time relationship is created.

Thus, as described above, the point-in-time SE feature increases the potential for a more effective use of system storage. However, combining multiple target point-in-time with space efficient volumes adds another problem to the cleaning process. That is, consider the situation where a customer has a daily backup copy, wherein every day, for example, the customer makes a new space efficient copy of this backup. Cascade and multiple target point-in-time and space efficient volumes enables this setup. Also, consider that in order to reduce time taken to complete the daily backup, the point-in-time map is made incremental. The problem with the cleaning process in this scenario is that the cleaning process will need to copy all the data from the daily backup to the latest space efficient copy. However, since the daily copy is a complete copy this will require that the whole of the space efficient copy will be allocated. Thus, with this scenario, the utilization of the space efficient volume is "broken" by the cascaded cleaning methodology.

Prior art solutions show how to perform many point-in-time copies of a single volume with the cost being independent of the number of such copies. Chaining of related point-in-time copies is allowed. Such an algorithm provides the standard copy-on-write algorithm, but still requires additional I/O that would not be required by a redirect on write implementation. This I/O comes in the form of the split write required to maintain the latest point-in-time image.

There would be an advantage to have an algorithm which provides the flexibility of prior art solutions in providing point-in-time copy images across multiple storage pools, but also provides the write I/O efficiency of redirect on write algorithms for snapshots where the storage is all in one pool.

Some storage controllers allow a user to configure more than one target for a given source. This has a number of applications. For instance, different experiments could be run against each of the targets. Or the targets might be taken at different times (e.g. different days in the week), and allow historical access to the disk, perhaps for the purpose of recovering from some data corruption, such as might be caused by a virus.

FIG. 1 depicts a backup process using a storage controller 8 and two storage disks 10, 12. The disks 10 and 12 could form part of a larger array of disks, and may form part of an enterprise storage solution. The disks 10 and 12 could be part of a storage solution relating to a commercial website, for example. If at any time a backup needs to be made of the content of disk 10 (v-disk1), then a Point-in-time copy instruction can be sent from the storage volume controller 8 to disk 10, which defines a source disk 10 (v-disk1) and also a target disk 12 (v-disk2), which is the target of the Point-in-time copy. The Point-in-time copy instruction creates a point-in-time copy of the image of the specific v-disk which is the source disk 10.

In an embodiment, the source disk 10 of a first Point-in-time copy instruction is v-disk1, and the target disk v-disk2. The Point-in-time copy instruction starts the Point-in-time copy process, which creates a map 14 from the source disk 10 to the target disk 12. This map is labeled MAP 1 in FIG. 1. The image of v-disk1 at this specific point in time is now available on v-disk2. This creates a backup of the data on v-disk1, and also allows tests and other administration tasks to be run on the data of v-disk1, without the potential danger of losing any of the original data, as it is preserved on the original source disk (i.e., disk 10).

When a point-in-time copy is made, it creates a link between disk 10 and disk 12, as defined by the map 14. Data may now be copied across in the background, with the additional requirement that any access to v-disk2 (as the target disk 12) may immediately cause the relevant parts of the image of v-disk1 to be copied across, and also any access to v-disk1 which would result in a change to the image stored by that disk 10 will also cause the unaltered data to be immediately copied across to the target disk 12, prior to the change being made. In this way, the v-disk2, to an outside user, stores the point-in-time copy of v-disk1, although data may only be physically copied across under the circumstances described above.

A storage volume that is the target volume of a backup process such as a point-in-time copy function can also be the source volume of another backup process, thus creating a cascade of storage volumes.

Figure 2:
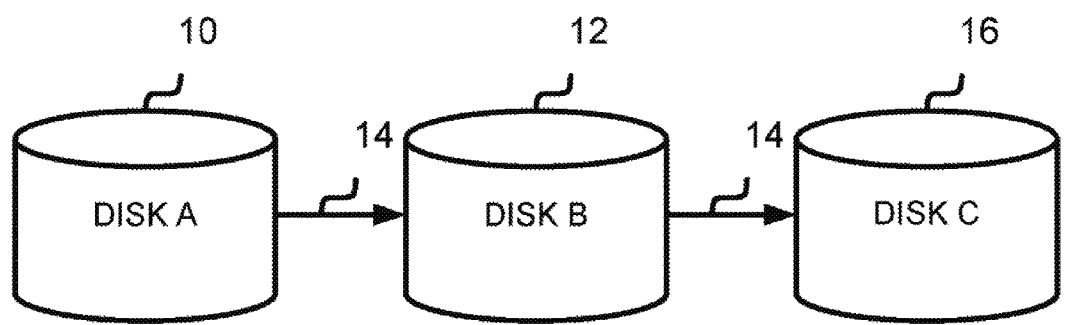
FIG. 2 depicts an example of a point-in-time copy cascade of three storage volumes, which are linked by point-in-time copy maps, in which an embodiment of the present invention may be implemented.

FIG. 2 depicts an example of a point-in-time copy cascade of three storage volumes Disk A 10, Disk B 12 and Disk C 16, which are linked by point-in-time copy maps 14. An "upstream" volume is one that is towards the primary volume using the current Disk B 12 as a reference, and a "downstream" volume is one that is away from the primary volume using the current Disk B 12 as a reference. For example, Disk A 10 is upstream from Disk B 12; and Disk C 16 is downstream from Disk B 12. Each map of maps 14 defines a backup process from a source volume to a target volume. Disk B is providing a backup of disk A 10, and Disk C 16 is also providing a backup of Disk A 10, through Disk B 12. The point-in-time copy functions 14 linking the different storage volumes may have been started at different times, which create different point-in-time copies of the images stored by the respective storage volumes, or could have been started simultaneously.

In the point-in-time copy cascade of A to B to C, where Disk A 10, Disk B 12 and Disk C 16 are the disks in the cascade, as shown in FIG. 2, the arrows are the point-in-time copy maps, then denoting [A, B] to be a point-in-time copy mapping from Disk A 10 to Disk B 12, the cascade has maps [A, B] and (B, C). In this implementation of the cascade, any new data write to Disk A 10 will cause a write that is a "copy write", to Disk B 12, as per the respective point-in-time copy function, which is required to maintain the image on Disk B 12. This writing to Disk B 12 will cause a further read, often referred to as a "clean read", of Disk B 12 followed by another copy write to Disk C 16. In this way, a single write to the first storage volume 10 in the cascade can result in a number of I/O cleaning operations throughout the cascade.

When a cascade is created, the new maps and new storage volumes are inserted into the cascade, not added to the end of the cascade. In the cascade shown in FIG. 2, the first backup process started would be A to C. When the backup process A to B is then started, the new target storage volume of Disk B 12 is effectively "inserted" between the existing source storage volume of Disk A 10 and the existing target storage volume of Disk C 16. This "insertion" is purely a logical construction illustrating the fact that target Disk C 16 will receive data writes from Disk B 12, rather than Disk A 10. This is how a cascaded implementation differs from a conventional arrangement which would have two independent maps from Disk A 10.

The storage controller 8 may be operated so that the disks and maps are arranged so that clones and snapshots are separated into different dependency chains or cascades. As described in greater detail below, one advantage of separating clones and snapshots into different cascades is to reduce or eliminate cleaning operations caused by termination of a copying operation.

Figure 3A:
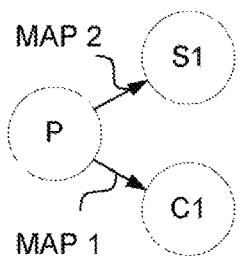
FIGS. 3A-3E depict point-in-time copy mappings, in which an embodiment of the present invention may be implemented.

FIGS. 3A-3E depict point-in-time copy mappings, in which an embodiment of the present invention may be implemented. For example, within the context of the present description, Map 1 of FIG. 3A is started as a clone and later Map 2 is started as a snapshot. The resulting graph structure for the source volume P, the clone volume C1, and the snapshot volume S1, and used to maintain the target images, would be as depicted in FIG. 3A. This structure is a dependency graph.

Figure 3B:
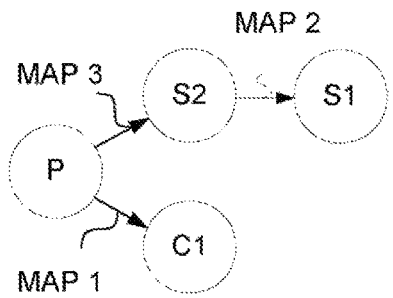

In the graph shown in FIG. 3A, a data write to disk P may require copy on writes to C1 and/or S1 in order to maintain those images on the target disks of the respective backup processes. If the storage volume controller 8 starts Map 3, as a snapshot, the resulting dependency graph is as depicted in FIG. 3B. In a cascade, the new disk and map to that disk may be placed adjacent to the source disk P, so the new target disk S2 of map 3 is placed in cascade P to S2 to S1, where the two maps, map 3 and map 2 are both snapshots. In the separate cascade P to C1 the map 1 is a clone.

Subsequent backup processes as either snapshots or clones of P extend the length of the clone and/or snapshot chains without increasing the number of edges leaving P and so do not increase the number of cleaning operation I/Os associated with a write to P. The graph of FIG. 3b can be extended to include further snapshots and clones. To maintain cascade type separation, if a cascade exists for the specific backup process type (clone or snapshot), then the target storage volume is added to the existing cascade for the identified backup process type, or if a cascade does not exist for the identified backup process type, then a new cascade is started, which consists of the target storage volume and the source storage volume. In this way clones and snapshots taken from specific source disks do not appear in the same cascade from that specific source disk.

Figure 3C:
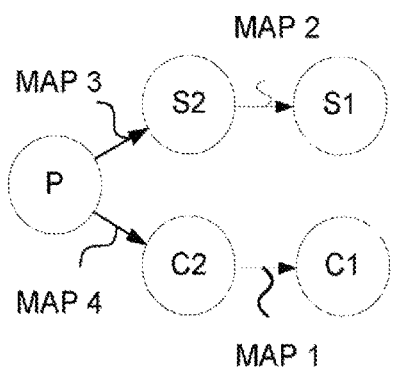

FIG. 3C depicts the logical arrangement of the storage volumes after further backup C2 has been taken. If the storage volume controller 8 starts Map 4 as a clone, the resulting dependency graph is as depicted in FIG. 3c. In a cascade, the new disk and map to that disk are placed adjacent to the source disk P, so the new target disk C2 of map 4 is placed in cascade P to C2 to C1, where the two maps, map 4 and map 1, are both clones. In the separate cascade P to S2 to S1, the two maps, map 3 and map 2, are both snapshots.

Figure 3D:
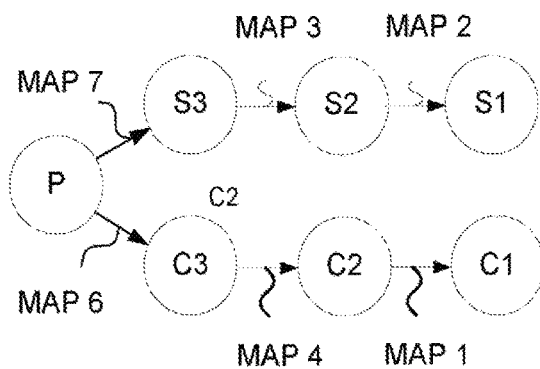

FIG. 3D depicts the logical arrangement of the storage volumes after further clone and snapshot backups C3 and S3 have been taken. The storage volume controller 8 starts map 6 as a clone and map 7 as a snapshot, the resulting dependency graph is as depicted in FIG. 3d. In a cascade, the new disk and map to that disk are placed adjacent to the source disk P, so the new target disk C3 of map 6 is placed in cascade P to C3 to C2 to C1 (FIG. 3D), where the three maps, map 6, map 4 and map 1, are each clones. The new target disk S3 of map 7 is placed in cascade P to S3 to S2 to S1 (FIG. 3D), where the three maps map 7, map 3 and map 2 are each snapshots.

The order in which the different types are taken can be any permutation of S1, S2, S3, C1, C2, C3 provided the snapshots are in the correct order relative to the other snapshots and the clones are in the correct order relative to other clones. For example, the start order could be S1, C1, S2, S3, C2, C3. These cascades can be considered as forming a tree with root node P as shown in FIG. 3D.

As per the respective point-in-time copy function with multiple target point-in-time copies, writes to a disk in a dependency graph would result in a read, split writes and a client write to maintain the other images on the disks. For example, a client (or host) write to P in the above dependency graph may result in 1) a read, that is, a read of P, if the data is required by S3 or C3 for the location being written to is on P, 2) a split write, that is a) a write to S3 of the data read from P, if S3 is dependent on P, and b) a write to C3 of the data read from P, if C3 is dependent on P (which can be performed in parallel to the second action), and 3) a client write, that is, the client write itself to P. As a result of these cleaning operations for each write to P, the volumes S3 and C3 are each independent of any grains changed since those backups were started.

One feature of separating clones and snapshots into different cascades is to facilitate termination of unnecessary backups to reduce or eliminate cleaning associated with the stop itself. For example, if map 4 is stopped in the dependency graph of FIG. 3D, the storage volume controller 8 will "clean" the data from C3 to C1. This may not be considered to be an added cleaning operation because C1 is also a clone and the data is intended to be copied onto it. The snapshots S3, S2, S1 are not affected.

Conversely, when a snapshot is stopped, all snapshots and clones of the target snapshot disk may be readily stopped due to the separation from the clone cascades without additional cleaning resulting from the stop. Furthermore, when a clone is stopped all snapshots of the target clone disk may also be stopped. This approach may be taken because a snapshot is typically dependent on its source. Consequently, if the clone source of a snapshot is destroyed, the dependent snapshot is likely of little or no use. In this manner, by separating clones and snapshots into different cascades, additional cleaning operations can be reduced or eliminated.

Figure 3E:
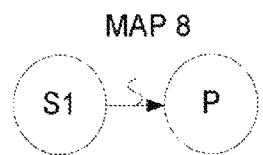

If it is now discovered, for example, that disk P is corrupt and the administrator wishes to restore disk P from an existing disk such as disk S1, for example, there is created and started a map 8, S1 to P, which results in cascade S1 to P (FIG. 3E). Using a separate cascade for the restore operation would result in three separate cascades. For instance, restoring P from S1 would result in cascades P to S3 to S2 to S1 and P to C3 to C2 to C1 (FIG. 3D) and S1 to P (FIG. 3E). Restoration of disk P is described below with reference to FIGS. 4, 5A, 5B, and 5C.

The system also allows a disk to exist a number of times in the same cascade or in separate cascades. As an example, S3, S2 and S1 are created as snapshots of P. S1 contains the user's original data, whereas S3 and S2 contain further snapshots on which two different simulations have been run. The user may decide that the result of the simulation on S2 is beneficial and decides to restore P from S2. The system allows for the user to start a new map S2 to P whilst still maintaining the unmodified backup of the original data in S1.

However, the more times that a disk appears in a cascade the more I/O operations may be required at the point-in-time copy level (cleaning I/Os) before a host originated I/O can be completed back to the host. Alternatively, to reverse a map, an administrator can simply create and start a map 14 in the opposite direction.

Figure 4:
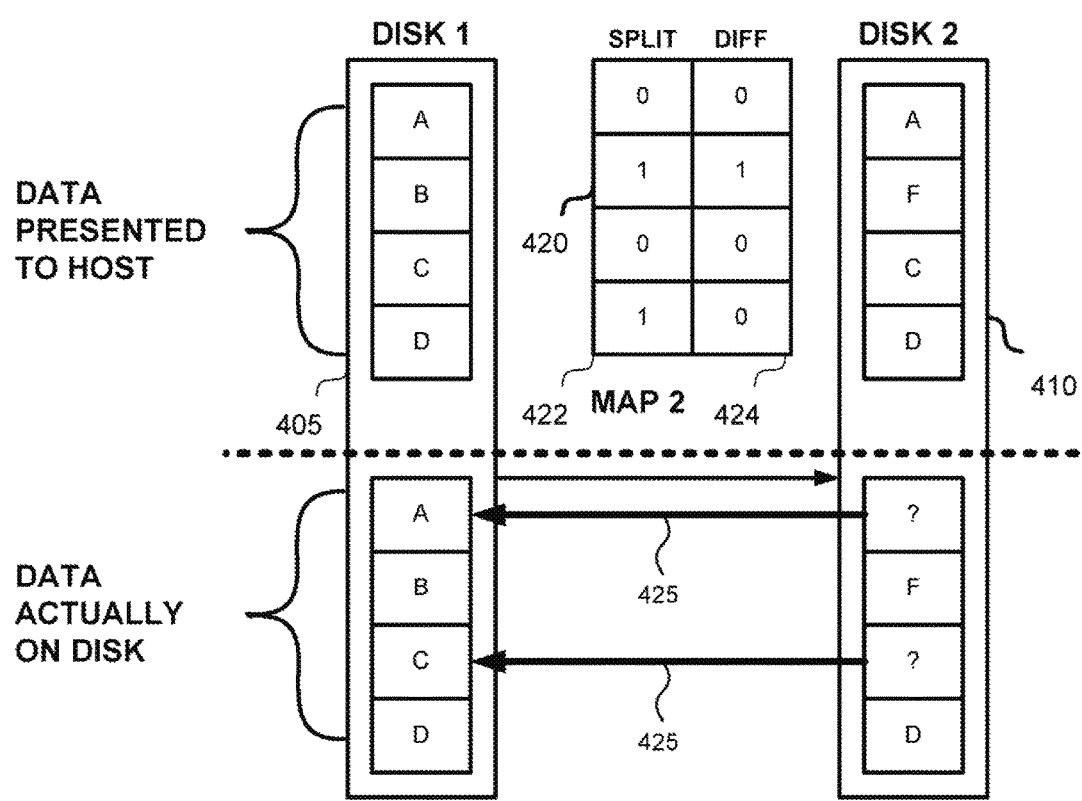
FIG. 4 depicts an exemplary cascade of a map, in which an embodiment of the present invention may be implemented.

FIG. 4 depicts an exemplary cascade of a map, in which an embodiment of the present invention may be implemented. More specifically, FIG. 4 depicts representations of two disks 405, and 410. As depicted in FIG. 4, the upper portions of the disks indicate data that is presented to, e.g., a host, from the respective disks. The disk as presented to a host is referred to as the "v-disk". A v-disk is a term used in storage virtualization to signify a virtual logical disk or volume with which a host computer or host computer application performs I/O operations. FIG. 4 also depicts the lower portions of the representations of the disks indicating the data that is actually contained on the respective disks. These lower portions of the disk are referred to as a "p-disk". The p-disk is an object that is directly connected to physical storage. A person skilled in the art would appreciate that the p-disk may itself be a virtual volume sitting on a Redundant Array of Independent Disks (RAID) array(s). A person skilled in the art would also appreciate that the storage controller 8 manages the copies at a virtual level, but that reads and writes to logical disks do result in reads and writes, respectively, to physical disks. Thus, Disk 1 405 presents four grains (or tracks) of data A, B, C, D to a user and actually has those grains A, B, C, D stored on Disk 1 405. In contrast, Disk 2 410 presents four grains of data A, F, C, D to a user. However, as shown in the bottom portion of Disk 2 410, Disk 2 410 actually only has stored thereon grains two and four (F and D, respectively) and relies upon data stored in Disk 1 405 to present the host with grains A and C. The fourth grain (D) is stored on Disk 2 410, even though the same data is available on Disk 1 405, due, for example a rewrite of data D onto Disk 1 405 previously.

As additionally depicted in FIG. 4, Map 2 420 is an incremental map between Disk 1 405 and Disk 2 410. That is, Map 2 420 includes a split bitmap (split) 422 and a difference bitmap (diff) 424. According to embodiments of the invention, the split bitmap 422 is used in a point-in-time process to track the location of the data. More specifically, a "0" in the split bitmap 422 indicates that the data is located on the source disk and a "1" in the split bitmap 422 indicates that the data is located on the target disk. Furthermore, the difference bitmap 424 is used in a point-in-time copy process to track the differences between the source and target disks, e.g., virtual disks. More specifically, a "0" in the difference bitmap 424 indicates there is no difference between the data located on the source disk and the target disk, and a "1" in the difference bitmap 424 indicates that there is a difference between the data located on the source disk and the data located on the target disk.

Thus, referring to the example of FIG. 4, the split bitmap 422 of Map 2 420 indicates that grains A and C are located on the source disk (Disk 1 405) and grains F and D are located on the target disk (Disk 2 410). Moreover, the difference bitmap 424 of Map 2 420 indicates that there is no difference between the first, third and fourth grain of the source disk (disk one 405) and the target disk (disk two 410). That is, the first, third and fourth grain remain the same between the source disk and the target disk, i.e. A, C and D, respectively. However, the difference bitmap 424 of Map 2 420 indicates that there is a difference for the second grain between the source disk (Disk 1 405) and the target disk (Disk 2 410). That is, as shown in FIG. 4, the second grain has been changed from B on Disk 1 405 to F on Disk 2 410. Thus pointers 425 illustrate that the target disk 410 refers to the source disk 405 based on the contents of the split bitmap 420 rather than to the physical contents of Disk 2 410. Advantageously, the use of bit maps 422 424 allows the storage controller 8 to manage access to virtual and physical copies of storage disk volumes, including management of the data content when copies are added or deleted from the system. When a copy is deleted from the chain, the contents representing data updates can be "cleaned" onto another copy in the remaining chain, based on the contents of the bit maps 422, 424.

Figure 5A:
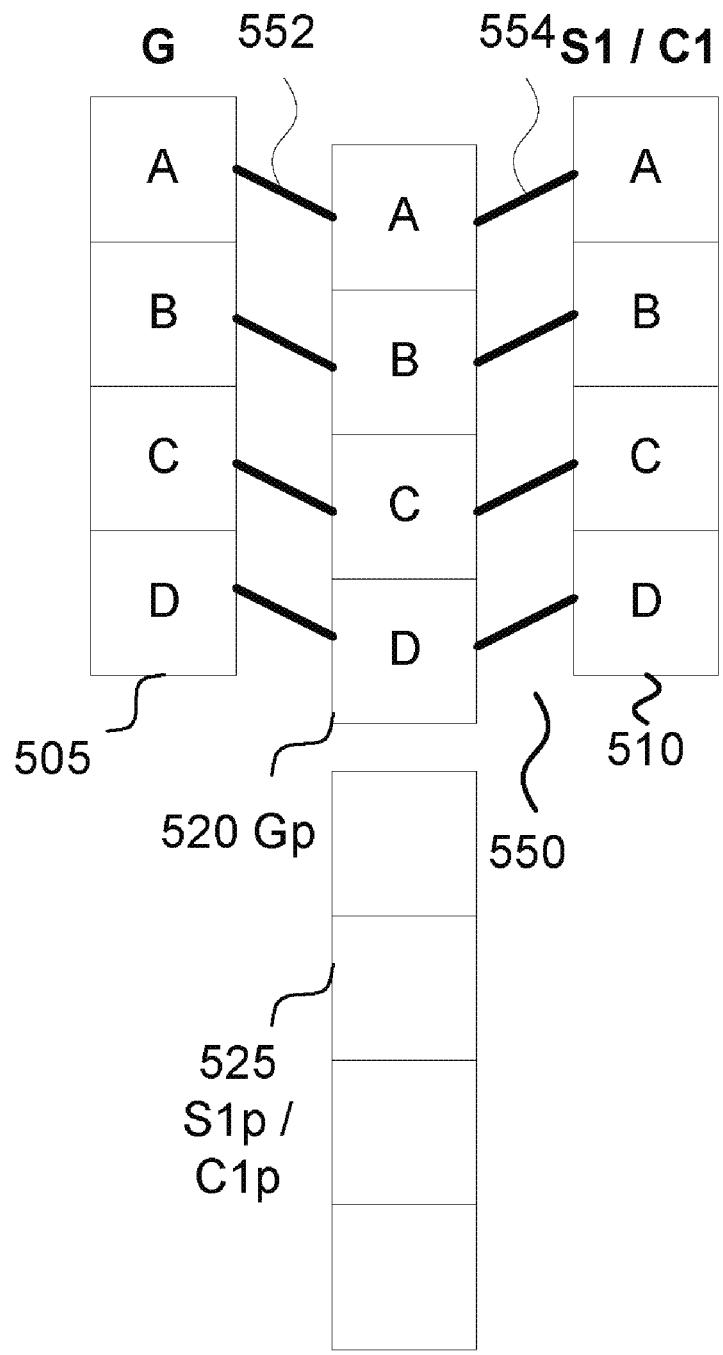
FIGS. 5A, 5B, 5C, depict relationships used in writing data to a copy cascade.
Figure 5B:
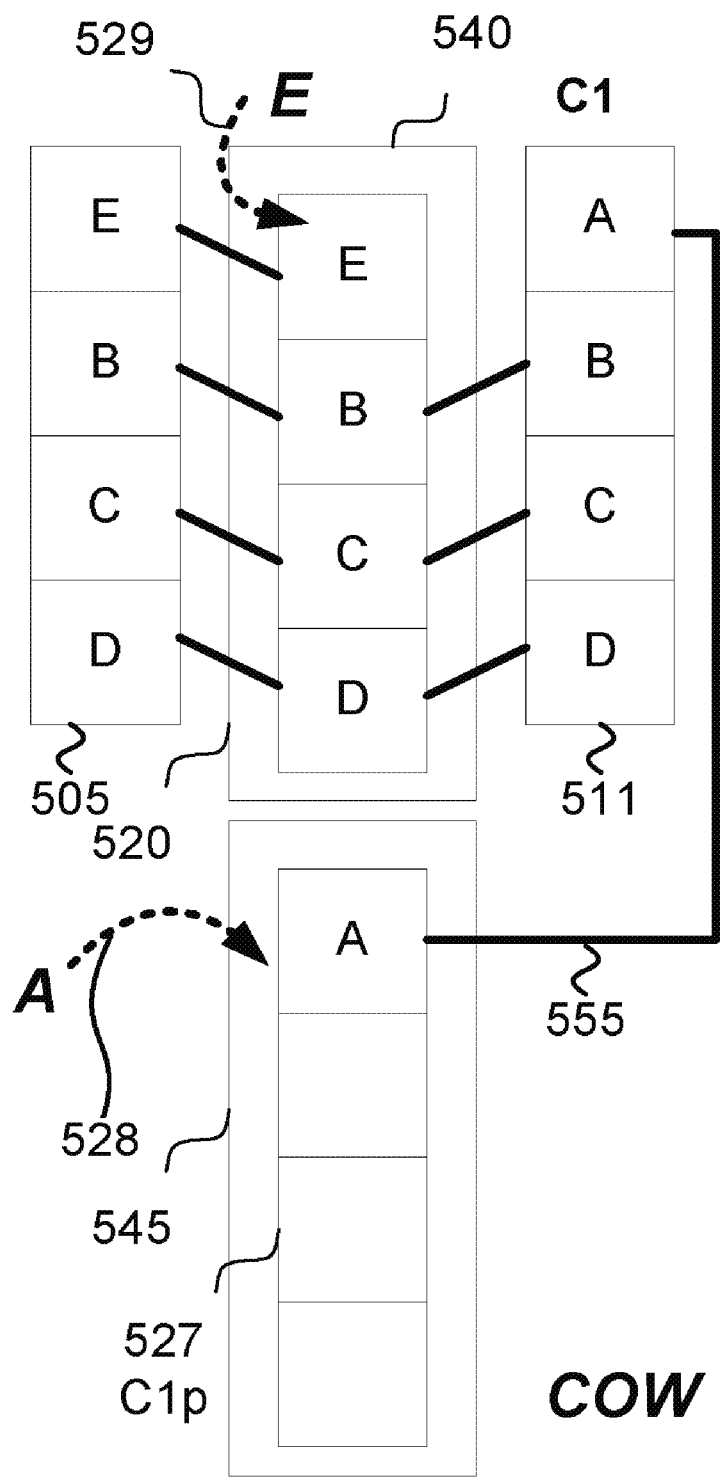
Figure 5C:
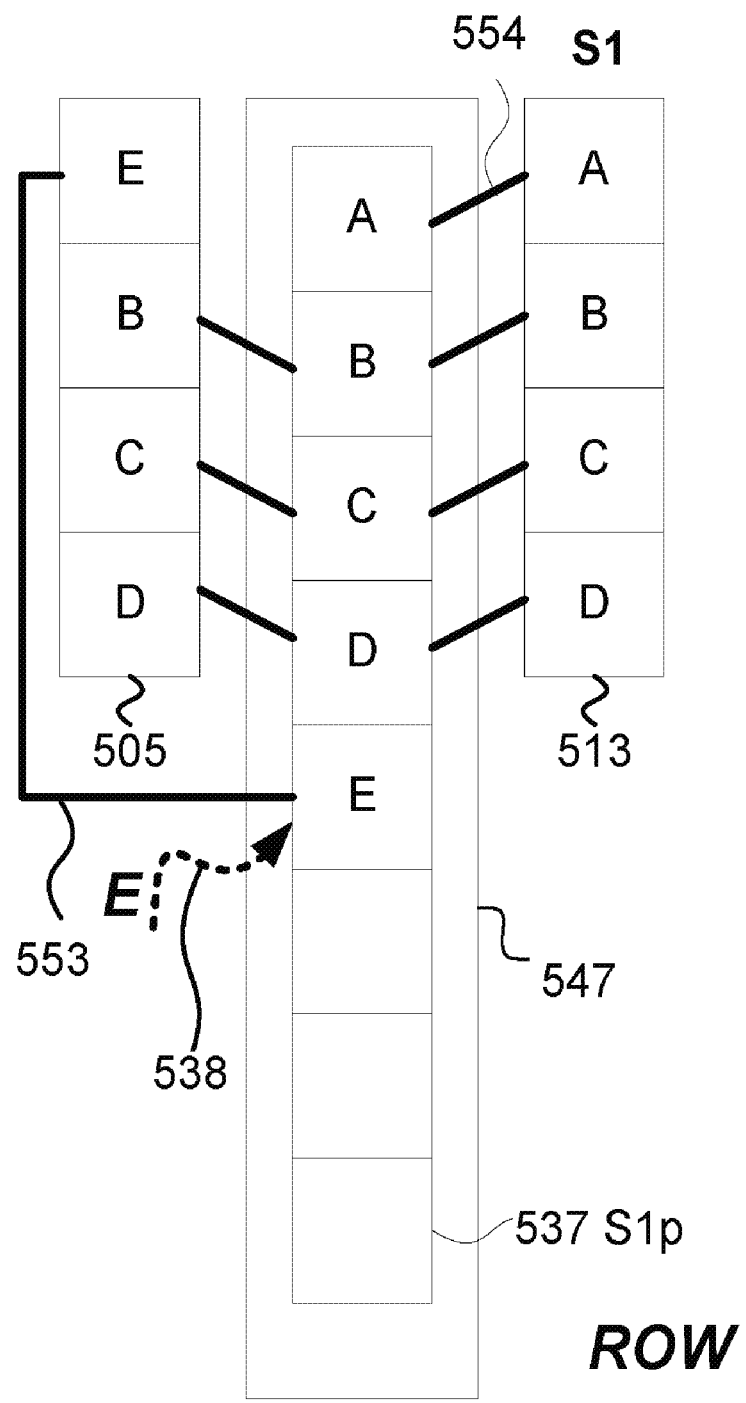

FIGS. 5A, 5B, and 5C, depict relationships used in writing data to a copy cascade.

There are two algorithms used to implement point-in-time solutions, these are redirect-on-write (ROW) and copy-on-write (COW). A COW algorithm occurs when a write of data causes the storage system to copy the original data from the source volume to a snapshot volume before proceeding with the write. With the COW snapshot algorithm, the original version of the data is kept in the snapshot volume, whereas the modified version of the data is kept in the source volume. A ROW snapshot algorithm occurs when a write of data is redirected to another location that is set aside for a snapshot, while the source volume maintains an original version of the data. The ROW snapshot algorithm effectively defers the taking of a snapshot until a later point in time.

FIG. 5A depicts a copy cascade in an initial state. A host view (v-disk) of a source disk G 505 has four grains, with data A, B, C, D. The data is physically stored on a physical disk Gp 520. The v-disk grains are related to respective grains in the physical disk Gp 520 through links 550, 552. The source disk G 505 has a clone or snapshot point-in-time copy 510. Initially, clone or snapshot point-in-time copy 510 has no separate physical data in a physical disk S1p/C1p 525, but instead points to physical storage location Gp 520 for data accesses. For example, the first grain of S1/C1 510 points to the first grain of Gp 520 through a link 554.

FIG. 5B depicts the copy cascade with the source disk G 505 having a clone point-in-time copy C1 511, before data has been copied to C1 511 through any background copy process. FIG. 5b depicts the copy cascade after data "E" has been written to the first grain of G 505 using a COW algorithm. On receipt of a write I/O operation to the first grain of G 505, the link 554 is redirected to point to the first grain of physical disk C1p 527 with a new link 555. Data "A" that had previously been in the first grain of Gp 520 is written 528 to the first grain of physical disk C1p 527. Data "E" is written 529 to the first grain of Gp 520. Typically, Gp 520 is in a first storage pool 540, and C1p 527 is in a second storage pool 545. Alternatively, Gp 520 and C1p 527 are in the same storage pool 540, 545. The data presented to a host for G 505 is (E, B, C, D); and the data presented to a host for C1 511 is (A, B, C, D). Gp 520 contains the live data for G 505. A COW algorithm is advantageous in the case of clone point-in-time copies, because the clone data can be easily kept track of, even if C1p 527 is in a second storage pool 545. Alternatively, physical storage C1p 527 can be easily moved to a second storage pool 545. To keep track of the location of data, COW algorithms typically use less metadata than an equivalent ROW implementation.

FIG. 5C depicts the copy cascade with the source disk G 505 having a snapshot point-in-time copy S1 513. FIG. 5c depicts the copy cascade after data "E" has been written to the first grain of G 505 using a ROW algorithm. On receipt of a write I/O operation to the first grain of G 505, the link 552 is redirected to point to the first grain of physical disk S1p 537 with a new link 553. Data "E" is written 538 to the first grain of S1p 537. Typically, Gp 520 and S1p 537 are in the same storage pool 547. The data presented to a host for G 505 is (E, B, C, D); and the data presented to a host for C1 511 is (A, B, C, D). The live data for G 505 is contained in Gp 520 and in S1p 537. A ROW algorithm is advantageous in the case of snapshot point-in-time copies, because only one write is required rather than having to first copy existing data to the point-in-time copy. Keeping track of the data is often more complicated in ROW configurations, but manageable in single storage pools.

Both ROW and COW have advantages and disadvantages for the implementer and ultimately the user of the resulting product. ROW can be more efficient in terms of write I/O overhead because the new write data is written to a new region rather than having to move the existing data prior to applying the write data. It is also the case that many advanced features such as revert/restore are simpler in ROW environments. A disadvantage of ROW over COW is that the data for all the images must usually be from a single storage pool. This means that ROW will often be optimal for the snapshot version of a point-in-time copy. Whereas the clone and backup cases often require the point-in-time copy to be in a separate storage pool, making COW the better algorithm.

The ROW algorithm does not have the double write penalty of COW. New writes to the original volume are redirected to another location set aside for snapshot. The advantage of redirecting the write is that only one write takes place, whereas with copy-on-write, two writes occur (one to copy original data onto the storage space, the other to copy changed data). With ROW, the original copy contains the point-in-time data, that is, snapshot, and the changed data reside on the snapshot storage. When a snapshot is deleted, the data from the snapshot storage must be reconciled back into the original volume. Furthermore, as multiple snapshots are created, access to the original data, tracking of the data in snapshots and original volume, and reconciliation upon snapshot deletion is further complicated. The snapshot relies on the original copy of the data and the original data set can quickly become fragmented.

In practice, having a mixed configuration using COW for clone point-in-time copies and ROW for snapshot point-in-time copies introduces its own complications, so, typically, one algorithm is used for both point-in-time copy types of COW. The added complexity for one is balanced with the reduced complexity for the other.

Advantageously, this invention introduces a way of combining the ROW and COW algorithms into a new algorithm for use when creating snapshots. This new algorithm has the write I/O advantages of ROW when operating within one storage pool whilst using the COW algorithm that allows multiple storage tiers to be used when needed.

Figure 6:
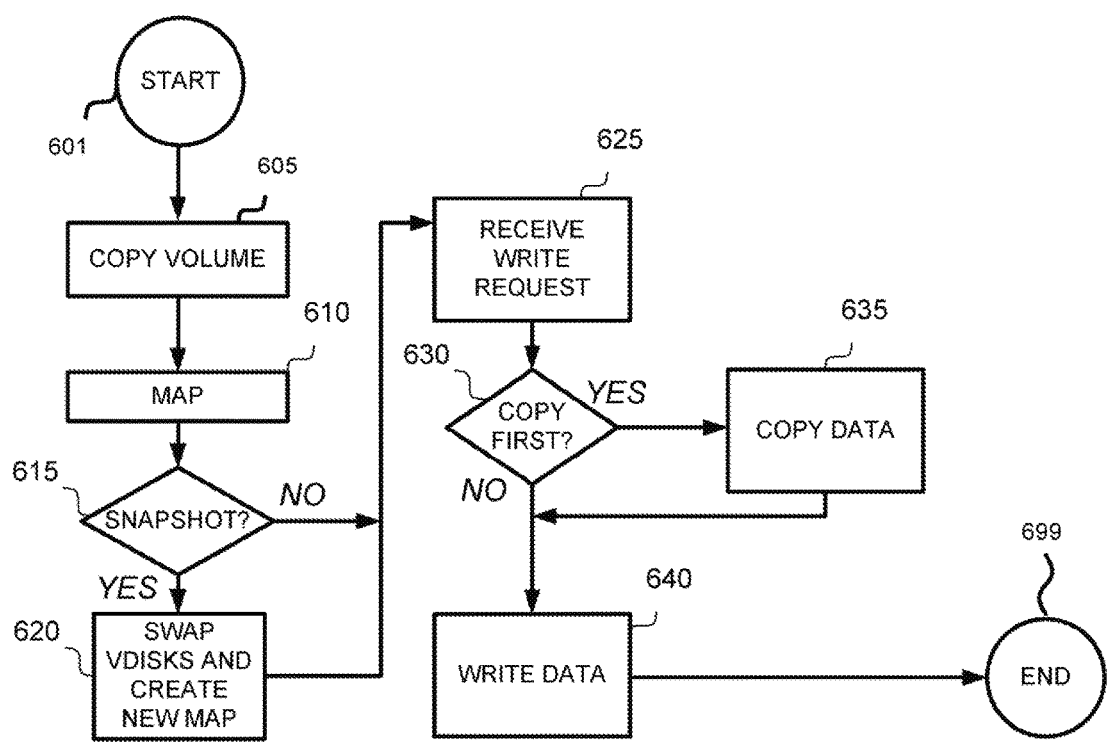
FIG. 6 depicts a method for writing to a source volume G in a point-in-time copy cascade.
Figure 7:
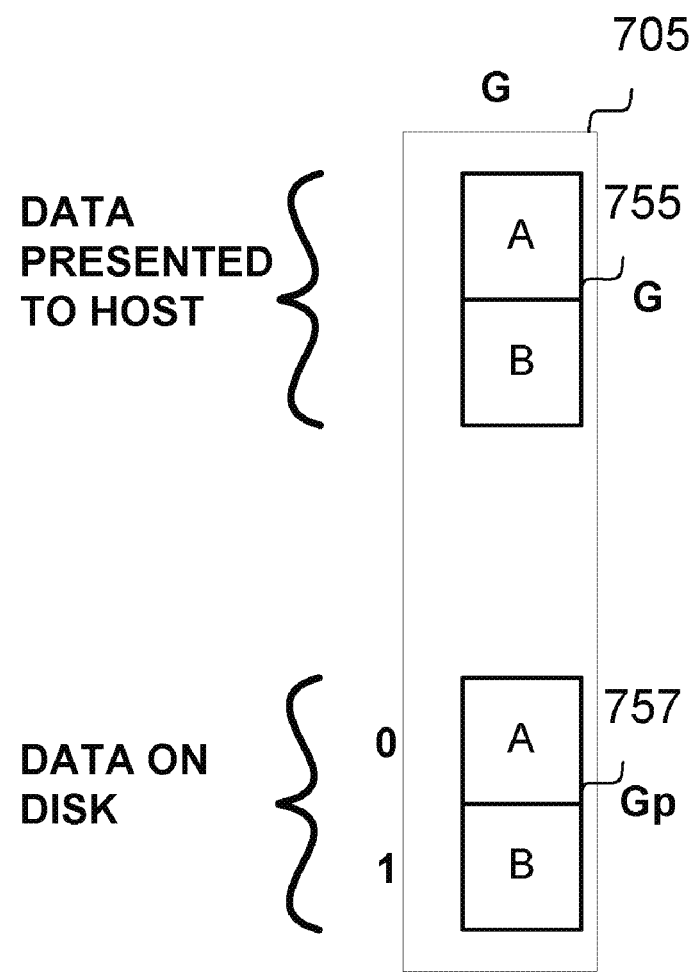
FIG. 7 depicts the initial data of a source disk.
Figure 8A:
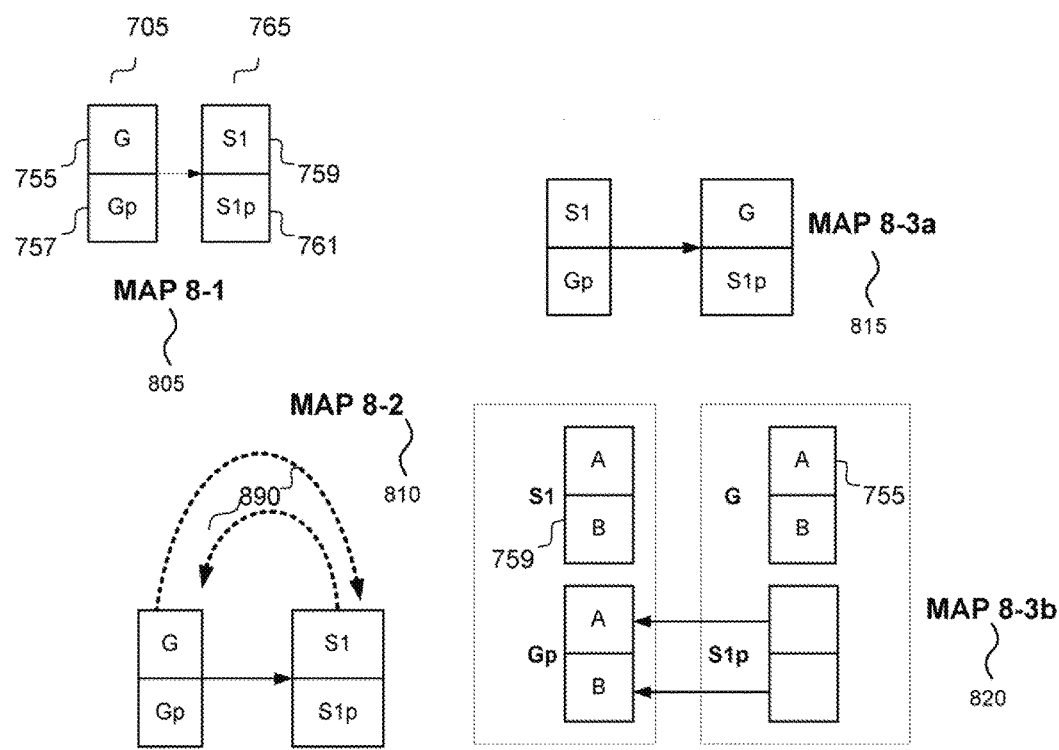
FIGS. 8A, 8B, and 8C depict mappings used in the method, in accordance with an embodiment of the present invention, with respective v-disks and p-disks depicted.
Figure 8B:
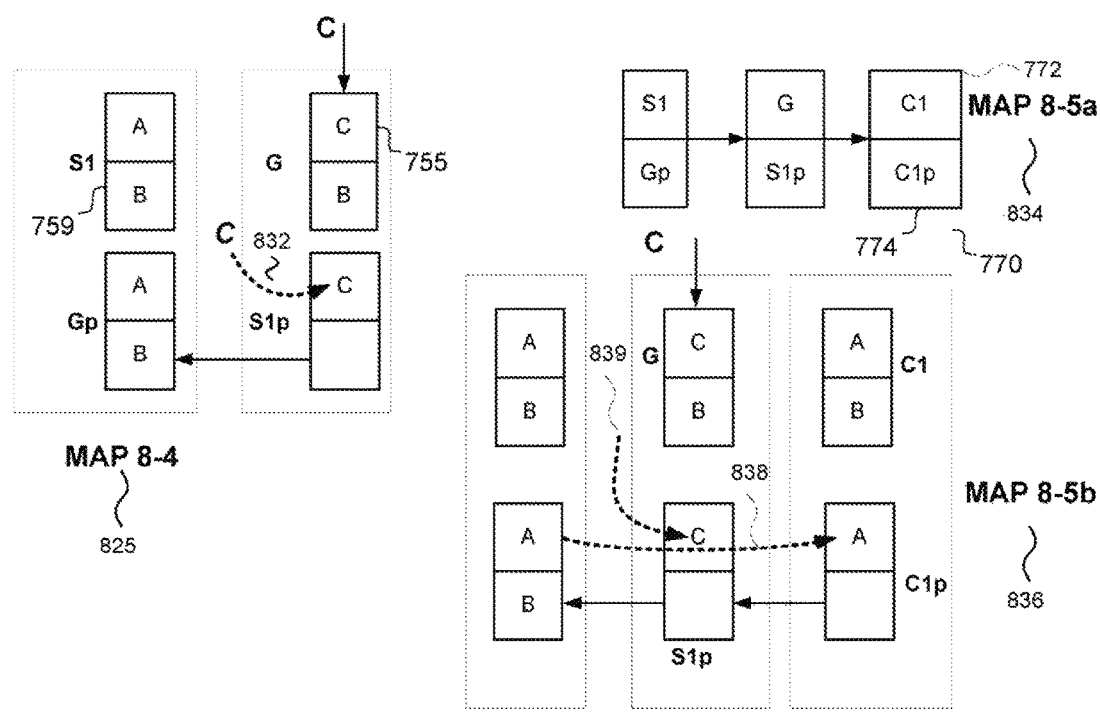
Figure 8C:
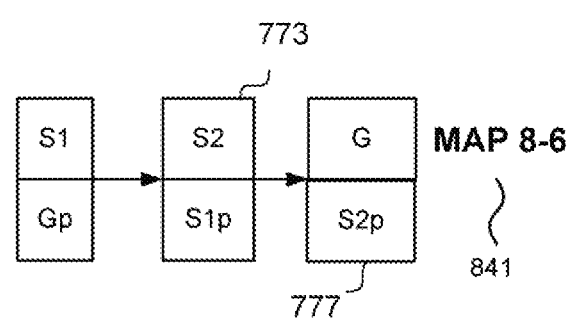
Figure 9:
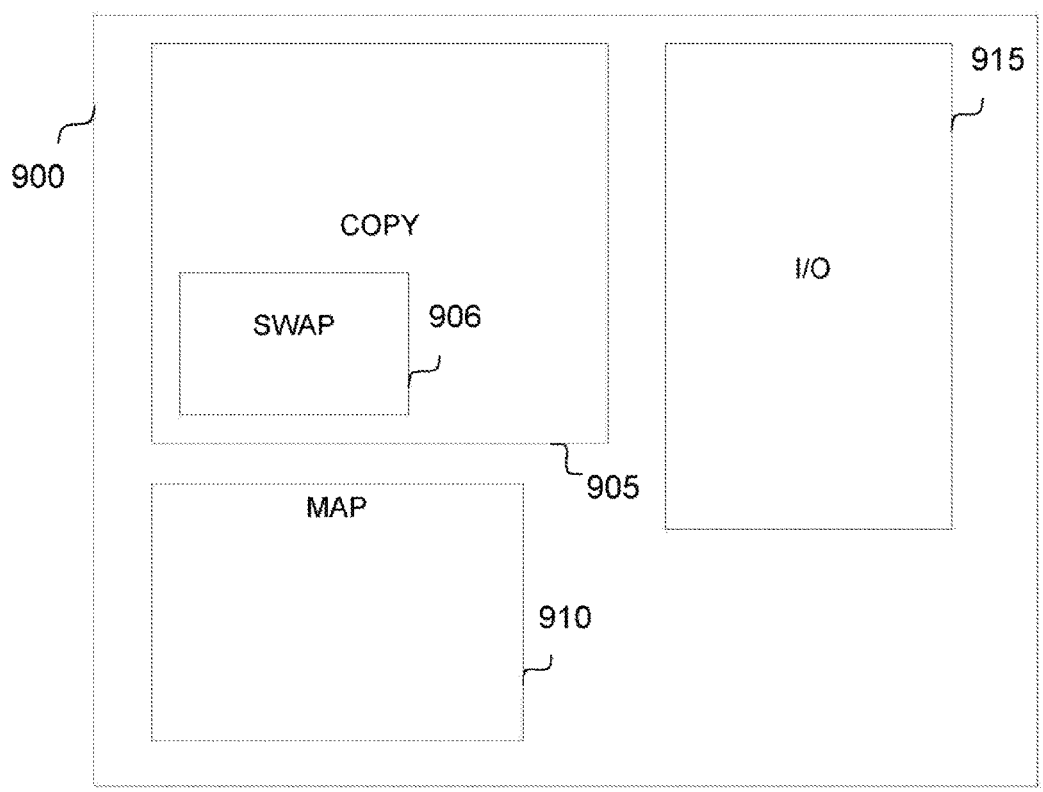
FIG. 9 depicts the components of a writing system.

FIG. 6, which should be read in conjunction with FIGS. 7, 8A-C and 9, depicts a method for writing to a source volume G in a point-in-time copy cascade. FIG. 7 depicts the initial data of a source disk G. FIG. 8 depicts mappings used in the method, in accordance with a preferred embodiment of the present invention, with respective v-disks and p-disks depicted. FIG. 9 depicts the components of writing system 900, which in a preferred embodiment is a component of storage controller 8. In an alternative embodiment the restoration system 900 is provided separately from the storage controller 8.

Advantageously, the invention works by separating the host view of the data from the physical devices used to store the data. That is, a volume is made up of a v-disk presented to host system and a p-disk which is the actual storage used to hold the data.

FIG. 7 depicts the initial data of a source disk G 705. The data presented to a host as G 755 comprises data [A, B]. The data stored on physical disk Gp 757 also comprises data [A, B]. The physical source disk Gp 757 has two grains of data, with data "A" in the first grain, designated "Gp-0", and with data "B" in the second grain, designated "Gp-1". A skilled person in the art will understand that the disk itself can be a logical disk, for example, contained within a RAID array.

The method starts at step 601. At step 605, a copy component 905 copies the source volume 705 to create a snapshot point-in-time copy 765. The snapshot point-in-time copy 765 comprises a host view (v-disk) S1 759, and physical disk S1p 761. At step 610, a map component 910 maps the volumes into a copy cascade to provide Map 8-1 805.

At step 615, a swap component 906 determines whether the point-in-time copy volume 765 is a snapshot point-in-time copy volume 765. As depicted in Map 8-2 810, as the point-in-time copy volume 765 is a snapshot point-in-time copy volume 765, at step 620, the swap component 906 swaps 890 the two v-disk views, heads G 755 and S1 759. The map component 910 maps the swap 890 to provide Map 8-2a 810. Map 8-2a 810 is depicted in more detail in Map 8-2b 820. The contents of S1p 761 link to the same storage locations as Gp 757, as no writes have been made to the contents of S1p 761. The data presented to a host for G 755 is [A, B]; and the data presented to a host for S1 759 is [A, B]. In this state the host's view for I/O is unchanged and S1 765 is the point-in-time copy volume image of G 705. Write I/O to G 705 will allocate new space for this I/O and therefore matches the I/O performance of the standard ROW algorithm. As G 705 and S1 765 are both provisioned from the same storage pool, the essential characteristics of the volumes are unchanged from the user's management perspective.

At step 625, an I/O component 915 receives a write request to write data "C" to the first grain of G 755. The map component 910 maps the write to create Map 8-4 825. As the heads G 755 and S1 759 have already been swapped, the write to G 705 is directed at S1p-0. At step 630, the I/O component uses a COW algorithm to determine whether another grain location needs to be first written to. In the configuration of Map 8-4 825 there is no downstream copy volumes, and therefore, at step 640, data "C" is written to S1p-0. The method ends at step 699.

Advantageously, without changing the COW algorithm used at the point of a write, ROW behavior has been achieved in the case of a snapshot point-in-time copy.

In one embodiment, a snapshot point-in-time copy 765 already exists. At step 605, a copy component 905 copies the snapshot point-in-time copy volume 765 to create a clone point-in-time copy 770. The clone point-in-time copy 770 comprises a host view (v-disk) C1 772, and physical disk C1p 774. At step 610, the map component 910 maps the volumes into a copy cascade to provide Map 8-5a 834. At step 615, the swap component 906 determines whether the point-in-time copy volume 770 is a snapshot point-in-time copy volume 770. However, point-in-time copy volume 770 is not a snapshot point-in-time copy volume 770, so at step 615 a "NO" exit is followed, in other words step 620 is not followed. The contents of C1p 774 link to the same storage locations as S1p 761, which in turn link to the same storage locations as Gp 757, as no writes have been made to the contents of S1p 761, nor to C1p 774. The data presented to a host for G 755 is [A, B]; the data presented to a host for S1 759 is [A, B]; and the data presented to a host for C1 772 is also [A, B].

At step 625, the I/O component 915 receives a write request to write data "C" to the first grain of G 755. The map component 910 maps the write to create Map 8-5b 836. As the heads G 755 and S1 759 have already been swapped, the write to G 705 is directed at S1p-0. At step 630, the I/O component uses a COW algorithm to determine whether another grain location needs to be first written to. In the configuration of Map 8-5b 836 there are downstream copy volumes, and therefore, exit YES is followed to step 635. At step 635, data "A" is copied 838 from Gp-0 to C1p-0. Then at step 640, data "C" is written 839 to S1p-0. The method ends at step 699. Advantageously, without changing the COW algorithm used at the point of a write, COW behavior has been achieved in the case of a clone point-in-time copy.

In one embodiment, a snapshot point-in-time copy 765 already exists. At step 605, a copy component 905 copies the G/S1p point-in-time copy volume 765 to create a new snapshot point-in-time copy. The new snapshot point-in-time copy comprises a host view (v-disk) S2 773, and physical disk S2p 777. At step 615, the swap component 906 determines whether the new point-in-time copy volume is a snapshot point-in-time copy volume. As the new point-in-time copy volume is a snapshot point-in-time copy volume, at step 615 the "YES" exit is followed. At step 620, the swap component 906 swaps the two v-disk views, heads G 755 and S2 773. The map component 910 maps the swap to provide Map 8-6 841. The contents of S2p 777 link to the same storage locations as Gp 757, as no writes have been made to either the contents of S1p 761, or S2p 777. The data presented to a host for G 755 is [A, B] the data presented to a host for S2 759 is [A, B]; and the data presented to a host for S2 773 is [A, B]. In this state the host's view for I/O is unchanged and S2 is the point-in-time copy volume image of G 705. Write I/O to G 705 will allocate new space for this I/O and therefore matches the I/O performance of the standard ROW algorithm. As G 705, S1 765, and S2 are both provisioned from the same storage pool, the essential characteristics of the volumes are unchanged from the user's management perspective. I/O processing can continue using the steps 625, 630, 640. The method ends at step 699.

It will be evident to a person skilled in the art that further snapshot point-in-time copies can made, with the production volume G 705 always processing I/O in a ROW manner.

Advantageously, the v-disk portion handles the host I/O and point-in-time copy processing, whereas the p-disk portion stores the data. Advantageously, a split is introduced between the logical image presented by the host and managed by the point-in-time copy algorithm and the physical storage used to hold the data. Each storage volume comprises a "v-disk" portion and a "p-disk" portion. The v-disk portion is considered as the "host" portion. The v-disk portion handles the host I/O and point-in-time processing, and the p-disk stores the data. Advantageously, the system can always roll forward restore operations at the user's request and tidy up abandoned restores in the background.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In an alternative embodiment the present invention may be realized in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
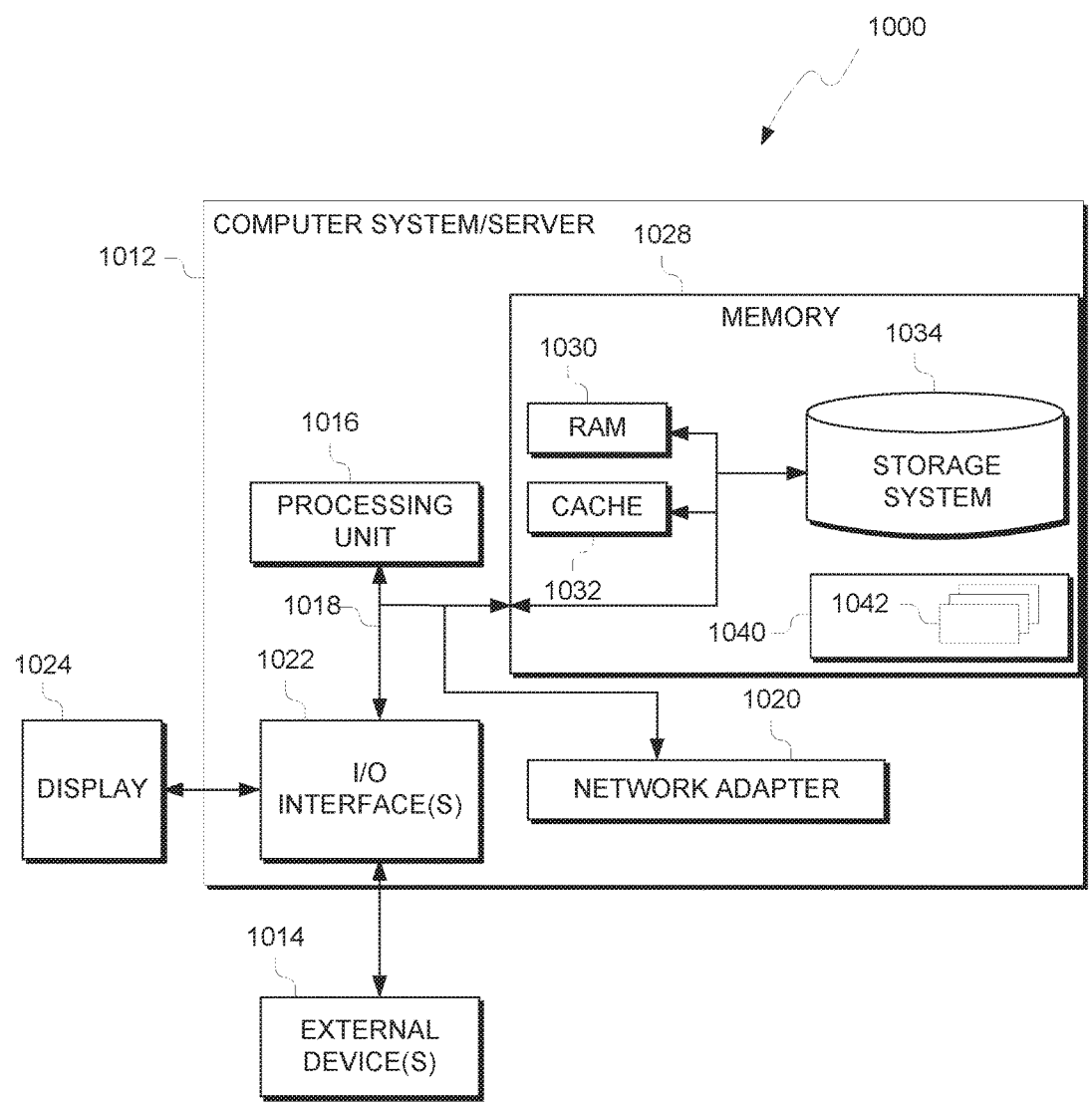
FIG. 10 depicts i) a computer system/server in a cloud computing node in the form of a general-purpose computing device, in which an embodiment of the present invention may be implemented, and ii) a block diagram of components of computing system/server, in accordance with illustrative embodiments of the present invention.

Referring now to FIG. 10, a schematic of an example of a cloud computing node is shown. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As depicted in FIG. 10, computer system/server 1012 in cloud computing node 1000 is shown in the form of a general-purpose computing device, in which an embodiment of the present invention may be implemented. The components of computer system/server 1012 may include, but are not limited to, one or more processors or processing units 1016, a system memory 1028, and a bus 1018 that couples various system components including system memory 1028 to processor 1016. Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, and external disk drive arrays, RAID systems, tape drives, and data archival storage systems, etc.

In another embodiment, FIG. 10 depicts a block diagram, 1000, of components of computing system/server 1012, in accordance with an illustrative embodiment of the present invention. It should be appreciated that FIG. 10 provides only an illustration of one implementation and does not imply any limitations with regard to the environments in which different embodiments may be implemented. Many modifications to the depicted environment may be made.

Computing system/server 1012 includes communications fabric 1018, which provides communications between processing unit 1016, memory 1028, network adapter 1020, and input/output (I/O) interface(s) 1022. Communications fabric 1018 can be implemented with any architecture designed for passing data and/or control information between processors (such as microprocessors, communications and network processors, etc.), system memory, peripheral devices, and any other hardware components within a system. For example, communications fabric 1018 can be implemented with one or more buses.

Memory 1028 and storage system 1034 are computer-readable storage media. In this embodiment, memory 1028 includes random access memory (RAM) 1030 and cache memory 1032. In general, memory 1028 can include any suitable volatile or non-volatile computer-readable storage media.

Various programs and data (e.g., components of a writing system as discussed herein) are stored in storage system 1034 for execution and/or access by one or more of the respective processing unit 1016 via one or more memories of memory 1028. In this embodiment, storage system 1034 includes a magnetic hard disk drive. Alternatively, or in addition to a magnetic hard disk drive, storage system 1034 can include a solid state hard drive, a semiconductor storage device, read-only memory (ROM), erasable programmable read-only memory (EPROM), flash memory, or any other computer-readable storage media that is capable of storing program instructions or digital information.

The media used by storage system 1034 may also be removable. For example, a removable hard drive may be used for storage system 1034. Other examples include optical and magnetic disks, thumb drives, and smart cards that are inserted into a drive for transfer onto another computer-readable storage medium that is also part of persistent storage X08.

Network adapter 1020, in these examples, provides for communications with other data processing systems or devices. In these examples, network adapter 1020 includes one or more network interface cards. Network adapter 1020 may provide communications through the use of either or both physical and wireless communications links. Various programs and data (e.g., components of a writing system as discussed herein) may be downloaded to storage system 1034 through network adapter 1020.

I/O interface(s) 1022 allows for input and output of data with other devices that may be connected to computing system 1012. For example, I/O interface 1022 may provide a connection to external devices 1014 such as a keyboard, keypad, a touch screen, and/or some other suitable input device. External devices 1014 can also include portable computer-readable storage media such as, for example, thumb drives, portable optical or magnetic disks, and memory cards. Software and data used to practice embodiments of the present invention, e.g., components of a writing system as discussed herein, can be stored on such portable computer-readable storage media and can be loaded onto storage system 1034 via I/O interface(s) 1022. I/O interface(s) 1022 also connect to a display 1024.

Display 1024 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

Figure 11:
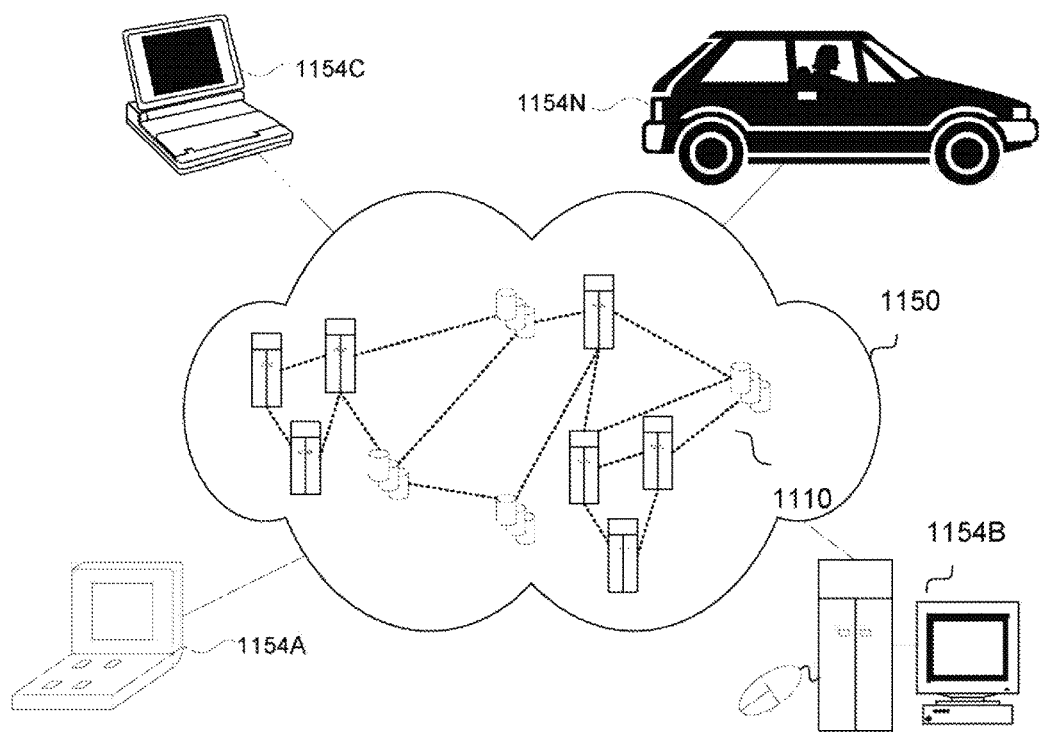
FIG. 11 depicts an illustrative cloud computing environment, in which an embodiment of the present invention may be implemented.

FIG. 11 depicts an illustrative cloud computing environment 1150, in which an embodiment of the present invention may be implemented. As shown, cloud computing environment 1150 comprises one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
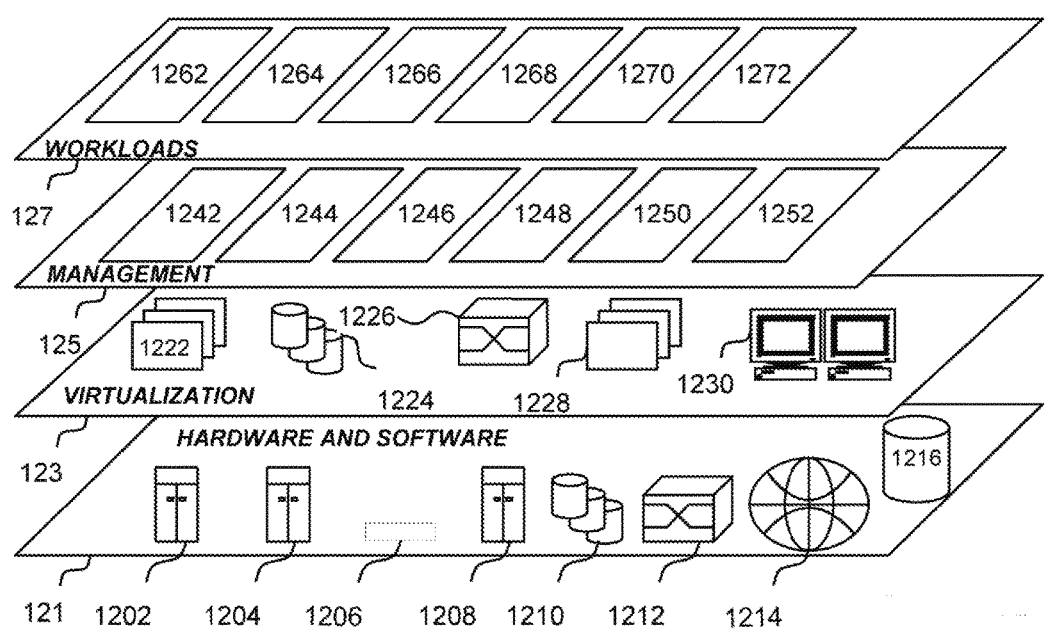
FIG. 12 depicts a set of functional abstraction layers provided by cloud computing environment of FIG. 11, in which an embodiment of the present invention may be implemented.

FIG. 12 depicts a set of functional abstraction layers provided by cloud computing environment 1150 of FIG. 11, in which an embodiment of the present invention may be implemented. It should be understood in advance that the components, layers, and functions shown in FIG. 12 are intended to be illustrative only and embodiments of the invention are not limited thereto. As depicted, the following layers and corresponding functions are provided:

Hardware and software layer 121 includes hardware and software components. Examples of hardware components include mainframes 1202, in one example IBM® zSeries® systems; RISC (Reduced Instruction Set Computer) architecture based servers 1204, in one example IBM pSeries® systems; IBM xSeries® systems 1206; IBM BladeCenter® systems 1208; storage devices 1210; networks and networking components 1212. Examples of software components include network application server software 1214, in one example IBM WebSphere® application server software; and database software, in one example IBM DB2® database software 1216. IBM, zSeries, pSeries, xSeries, BladeCenter, i2, Analysts Notebook, Tivoli, Netcool, WebSphere and DB2 are trademarks of International Business Machines Corporation, registered in many jurisdictions worldwide.

Virtualization layer 123 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 125 may provide the functions described below. Resource provisioning 1242 provides dynamic procurement of computing resources and other resources that are utilized to perform tasks within the cloud computing environment. Metering and Pricing 1244 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1246 provides access to the cloud computing environment for consumers and system administrators. Service level management 1248 provides cloud computing resource allocation and management such that required service levels are met. Service Level Agreement (SLA) planning and fulfilment 1250 provide pre-arrangement for, and procurement of, cloud computing resources for which a future requirement is anticipated in accordance with an SLA.

Workloads layer 127 provides examples of functionality for which the cloud computing environment may be utilized. Examples of workloads and functions which may be provided from this layer include: mapping and navigation 1262; software development and lifecycle management 1264; virtual classroom education delivery 1266; data analytics processing 1268; transaction processing 1270; and restoration system 900 processing 1272 of a preferred embodiment of the present invention. Alternatively, restoration system 900 processing 1252 can be carried out at the management layer 125.

Figure 13:
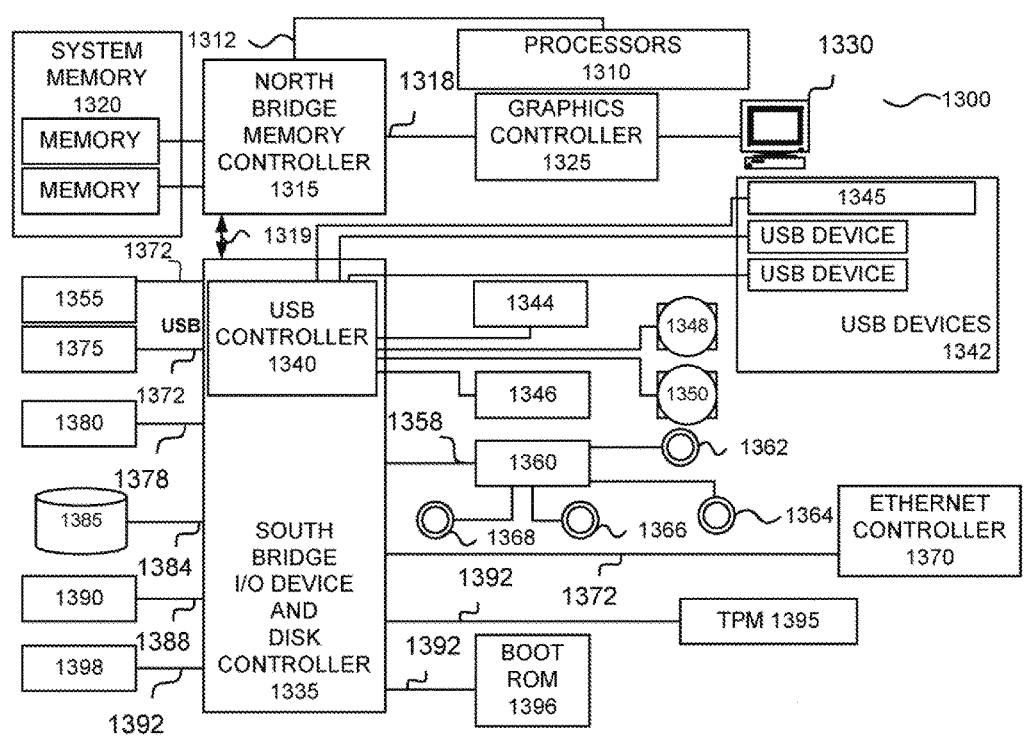
FIG. 13 depicts an information handling system, which is a simplified example of a computer system capable of performing the computing operations described herein, in which an embodiment of the present invention may be implemented.

FIG. 13 depicts an information handling system 1300, which is a simplified example of a computer system capable of performing the computing operations described herein, in which an embodiment of the present invention may be implemented. Information handling system 1300 includes one or more processors 1310 coupled to processor interface bus 1312. Processor interface bus 1312 connects processors 1310 to Northbridge 1315, which is also known as the Memory Controller Hub (MCH). Northbridge 1315 connects to system memory 1320 and provides a means for processor(s) 1310 to access the system memory. Graphics controller 1325 also connects to Northbridge 1315. In one embodiment, PCI Express bus 1318 connects Northbridge 1315 to graphics controller 1325. Graphics controller 1325 connects to display device 1330, such as a computer monitor. Northbridge 1315 and Southbridge 1335 connect to each other using bus 1319. In one embodiment, the bus is a Direct Media Interface (DMI) bus that transfers data at high speeds in each direction between Northbridge 1315 and Southbridge 1335. In one embodiment, a Peripheral Component Interconnect (PCI) bus connects the Northbridge and the Southbridge. Southbridge 1335, also known as the I/O Controller Hub (ICH) is a chip that generally implements capabilities that operate at slower speeds than the capabilities provided by the Northbridge. Southbridge 1335 typically provides various busses used to connect various components. These busses include, for example, PCI and PCI Express busses, an ISA bus, a System Management Bus (SMBus or SMB), and/or a Low Pin Count (LPC) bus 1392. The LPC bus often connects low-bandwidth devices, such as boot ROM 1396 and "legacy" I/O devices (using a "super I/O" chip). The "legacy" I/O devices 1398 can include, for example, serial and parallel ports, keyboard, mouse, and/or a floppy disk controller. The LPC bus also connects Southbridge 1335 to Trusted Platform Module (TPM) 1395. Other components often included in Southbridge 1335 include a Direct Memory Access (DMA) controller, a Programmable Interrupt Controller (PIC), and a storage device controller, which connects Southbridge 1335 to nonvolatile storage device 1385, such as a hard disk drive, using bus 1384.

ExpressCard 1355 is a slot that connects hot-pluggable devices to the information handling system. ExpressCard 1355 supports both PCI Express and USB connectivity as it connects to Southbridge 1335 using both the Universal Serial Bus (USB) the PCI Express bus. Southbridge 1335 includes USB Controller 1340 that provides USB connectivity to devices that connect to the USB. These devices include webcam (camera) 1350, infrared (IR) receiver 1348, keyboard and trackpad 1344, and Bluetooth device 1346, which provides for wireless personal area networks (PANs). USB Controller 1340 also provides USB connectivity to other miscellaneous USB connected devices 1342, such as a mouse, removable nonvolatile storage device 1345, modems, network cards, ISDN connectors, fax, printers, USB hubs, and many other types of USB connected devices. While removable nonvolatile storage device 1345 is shown as a USB-connected device, removable nonvolatile storage device 1345 could be connected using a different interface, such as a Firewire interface, etc.

Wireless Local Area Network (LAN) device 1375 connects to Southbridge 1335 via the PCI or PCI Express bus 1372. LAN device 1375 typically implements one of the IEEE 802.11 standards of over-the-air modulation techniques that all use the same protocol to wireless communicate between information handling system 1300 and another computer system or device. Optical storage device 1390 connects to Southbridge 1335 using Serial ATA (SATA) bus 1388. Serial ATA adapters and devices communicate over a high-speed serial link. The Serial ATA bus also connects Southbridge 1335 to other forms of storage devices, such as hard disk drives. Audio circuitry 1360, such as a sound card, connects to Southbridge 1335 via bus 1358. Audio circuitry 1360 also provides functionality such as audio line-in and optical digital audio in port 1362, optical digital output and headphone jack 1364, internal speakers 1366, and internal microphone 1368. Ethernet controller 1370 connects to Southbridge 1335 using a bus, such as the PCI or PCI Express bus. Ethernet controller 1370 connects information handling system 1300 to a computer network, such as a Local Area Network (LAN), the Internet, and other public and private computer networks.

While FIG. 13 shows one information handling system 1300, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. The Trusted Platform Module (TPM 1395) shown in FIG. 13 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 13.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Java and all Java-based trademarks and logos are trademarks or registered trademarks of Oracle and/or its affiliates.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In an alternative embodiment the present invention may be implemented in a computer program (or application) stored in a medium, being connected to hardware to resolve the problem.

The present invention may be a system, a method, and/or a computer program product. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For the avoidance of doubt, the term "comprising", as used herein throughout the description and claims is not to be construed as meaning "consisting only of".

What is claimed is:

1. A method for managing storage volumes in a point-in-time copy cascade, the method comprising:

creating, by one or more processors, a point-in-time copy volume of a volume in the point-in-time copy cascade, wherein (a) the point-in-time copy cascade includes (i)

a source volume and (ii) a first snapshot point-in-time copy volume of the source volume: and (b) the point-in-time copy volume is a second snapshot copy of the source volume;

generating, by the one or more processors, one or more point-in-time copy mappings between the (i) the source volume; (ii) the first snapshot point-in-time copy volume; and (iii) the point-in-time copy volume;

swapping, by the one or more processors, a host portion of the source volume with a host portion of the second snapshot point-in-time copy volume;

updating, by the one or more processors, the one or more point-in-time copy mappings based at least in part, on the swapping of the host portion and the second snapshot point-in-time copy volume; and directing, by the one or more processors, a write request to at least one volume of the point-in-time copy cascade based, at least in part, on the one or more point-in-time copy mappings, wherein the write request includes a request to overwrite a first data value in a grain of the source volume with a second data value.

2. The method of claim 1, wherein directing, by the one or more processors, the write request further comprises:

writing, by the one or more processors, the second data value in a corresponding grain of the second snapshot point-in-time copy volume.

3. A computer program product for managing storage volumes in a point-in-time copy cascade, the computer program product comprising:

one or more computer-readable storage media and program instructions stored on the one or more computer-readable storage media, the program instructions comprising:

program instructions to create a point-in-time copy volume of a volume in the point-in-time copy cascade, wherein (a) the point-in-time copy cascade includes (i) a source volume and (ii) a first snapshot point-in-time copy volume of the source volume; and (b) the point-in-time copy volume is a second snapshot copy of the source volume;

program instructions generate one or more point-in-time copy mappings between the (i) the source volume; (ii) the first snapshot point-in-time copy volume; and (iii) the point-in-time copy volume;

program instructions to swap a host portion of the source volume with a host portion of the second snapshot point-in-time copy volume;

program instructions to update the one or more point-in-time copy mappings based, at least in part, on the swapping of the host portion and the second snapshot point-in-time copy volume; and program instructions direct a write request to at least one volume of the point-in-time copy cascade based, at least in part, on the one or more point-in-time copy mappings, wherein the write request includes a request to overwrite a first data value in a grain of the source volume with a second data value.

4. The computer program product of claim 3, wherein directing, by the one or more processors, the write request further comprises:

program instructions to write the second data value in a corresponding grain of the second snapshot point-in-time copy volume.

5. A computer system for managing storage volumes in a point-in-time copy cascade, the computer system comprising:

one or more computer processors;

one or more computer readable storage media; and program instructions stored on the computer readable storage media for execution by at least one of the one or more processors, the program instructions comprising:

program instructions to create a point-in-time copy volume of a volume in the point-in-time copy cascade, wherein (a) the point-in-time copy cascade includes (i) a source volume and (ii) a first snapshot point-in-time copy volume of the source volume; and (b) the point-in-time copy volume is a second snapshot copy of the source volume;

program instructions generate one or more point-in-time copy mappings between the (i) the source volume; (ii) the first snapshot point-in-time copy volume; and (iii) the point-in-time copy volume;

program instructions to swap a host portion of the source volume with a host portion of the second snapshot point-in-time copy volume;

program instructions to update the one or more point-in-time copy mappings based at least in part, on the swapping of the host portion and the second snapshot point-in-time copy volume; and program instructions direct a write request to at least one volume of the point-in-time copy cascade based, at least in part, on the one or more point-in-time copy mappings, wherein the write request includes a request to overwrite a first data value in a grain of the source volume with a second data value.

6. The computer system of claim 5, wherein directing, by the one or more processors, the write request further comprises:

program instructions to write the second data value in a corresponding grain of the second snapshot point-in-time copy volume.

* * * * *